United States Patent [19]

Clagett et al.

[11] Patent Number: 4,937,130

[45] Date of Patent: Jun. 26, 1990

[54] POLYCARBONATE CONTAINER HAVING INTERNAL LAYERS OF AMORPHOUS POLYAMIDE

[75] Inventors: Donald C. Clagett, Pittsfield; David M. Handler, Lenox, both of Mass.; Louis M. Maresca, Schenectady, N.Y.; Sheldon J. Shafer, Pittsfield; G. Fred Willard, Dalton, both of Mass.

[73] Assignee: General Electric Company, Pittsfield, Mass.

[21] Appl. No.: 298,390

[22] Filed: Jan. 18, 1989

[51] Int. Cl.$^5$ .................. B65D 23/00; B32B 27/08
[52] U.S. Cl. ............................. 428/35.7; 428/36.7; 428/412; 428/474.7; 428/474.9; 215/1 C
[58] Field of Search ............... 428/35.7, 36.7, 474.4, 428/475.4, 412, 474.7, 474.9; 215/1 C

[56] References Cited

U.S. PATENT DOCUMENTS

| | | | |
|---|---|---|---|
| 4,469 | 5/1988 | Deak | 428/474.4 |
| 4,513,037 | 4/1985 | Collins | 425/480 |
| 4,605,576 | 8/1986 | Jabarin | 428/36.7 |
| 4,798,874 | 1/1989 | Maresca et al. | 525/425 |
| 4,800,129 | 1/1989 | Deak | 428/474.4 |

Primary Examiner—James Seidleck
Attorney, Agent, or Firm—Spencer D. Conard

[57] ABSTRACT

A container comprised of an inner aromatic polycarbonate layer, an outer aromatic polycarbonate layer, and an intermediate amorphous polyamide layer between the inner polycarbonate layer and the outer polycarbonate layer. The amorphous polyamide intermediate layer provides the container with enhanced processability, excellent gas barrier properties and hot fill capabilities.

13 Claims, No Drawings

POLYCARBONATE CONTAINER HAVING INTERNAL LAYERS OF AMORPHOUS POLYAMIDE

BACKGROUND OF THE INVENTION

1. Field of the Invention

The present invention relates to polycarbonate containers and more particularly relates to polycarbonate containers having an amorphous nylon intermediate layer.

2. Description of Related Art

Multilayer hollow polycarbonate containers having intermediate layers comprised of a thermoplastic resin exhibiting gas-barrier properties are known in the art. For example, Collins, U.S. Pat. No. 4,513,037 sets forth a multilayered hollow polycarbonate container comprised of (i) at least one, inner polycarbonate layer; (ii) at least one outer polycarbonate layer; and (iii) at least one intermediate layer between said inner polycarbonate layer and said outer polycarbonate layer comprised of a thermoplastic resin exhibiting gas-barrier properties. Various resins are set forth as being suitable for coextrusion blow molding and include polyesters, nylons, polyvinylchloride, polyvinyldiene chloride, polyvinylalcohol, acrylonitrile, and copolymers of ethylene and vinyl alcohol such as those made by hydrolizing a copolymer of vinylacetate and ethylene. These multilayer polycarbonate containers offer several advantages over comparable monolayer polycarbonate containers including the ability to keep out oxygen from juices and other perishable foods therein, thereby preventing these foods from spoilage for longer periods of time than simple monolayer polycarbonate containers. These multilayered hollow polycarbonate containers also have several advantages over comparable glass containers including lighter weight and greater impact strength and resistance to breakage.

However, these multilayered polycarbonate containers typically have one or more of the following problems associated with them; (i) the apparent melt viscosities of the various layers differ significantly at extrusion temperatures thereby making it difficult to coextrusion blow mold bottles therefrom; (ii) regrind blends made from the waste materials obtained during blow molding typically lack clarity thereby making them useless as an internal layer for clear multilayered bottles; or (iii) the resin employed in the intermediate layer typically lacks a glass transition temperature sufficiently high to provide shape retention of the container during hot fill of juices usually in excess of 82° C., therein. Thus for example, crystalline polyamides while generally being suitable as an intermediate layer for multilayered polycarbonate containers suffer from several problems including lacking clarity and being somewhat difficult to coextrude with polycarbonate due to melt viscosity differences between aromatic polycarbonates and crystalline polyamides, and producing an opaque resin when blended with polycarbonate.

It is therefore an object of the present invention to provide multilayered polycarbonate containers having resin layers which have similar melt viscosities at extrusion temperatures for improved processability during coextrusion blow molding thereof.

It is a further object to provide a clear polycarbonate container employing resin layers which when made into a regrind blend provide a clear resin blend for use as an additional intermediate layer in the container.

Additionally, it is an object of the present invention to provide an intermediate layer having excellent gas barrier properties.

SUMMARY OF THE INVENTION

The present invention involves multilayered polycarbonate containers made by coextrusion blow molding of (i) at least one inner layer comprised of an aromatic polycarbonate resin, (ii) at least one outer layer comprised of an aromatic polycarbonate resin, and (iii) at least one intermediate layer comprised of an amorphous polyamide resin, said intermediate layer being disposed between said inner layer and said outer layer.

DESCRIPTION OF THE INVENTION

It has been found that transparent multilayered polycarbonate containers can be made by coextrusion blow molding with improved ease and processing during blow molding thereof. The containers exhibit the combined properties of being able to retain their shape during high temperature hot filling of juices therein and, exhibit excellent gas barrier properties, and provide minimum waste of resin by providing transparent regrind blends which are suitable as intermediate layers in the aforementioned containers.

The present polycarbonate containers comprise:

(i) at least one inner layer comprised of an aromatic polycarbonate resin;

(ii) at least one outer layer comprised of an aromatic polycarbonate resin; and (iii) at least one intermediate layer comprised of an amorphous polyamide resin, siad intermediate layer being disposed between said inner layer and said outer layer. Preferably the container further comprises a second intermediate layer comprised of a regrind blend of said polycarbonate resins and said amorphous polyamide resin.

The polycarbonate resins utilized in the present invention are well known in the art and are generally commercially available materials. These polycarbonates, as well as methods for their manufacture, are described, inter alia, in U.S. Pat. Nos. 3,161,615, 3,220,973, 3,312,659, 3,312,660, 3,313,777, 3,666,614 and 3,939,672, all of which are incorporated herein by reference. The polycarbonate resins may conveniently be prepared by the reaction of a dihydric phenol with a carbonate precursor via the interfacial polymerization process. Typically, the dihydric phenols utilized may be represented by the general formula

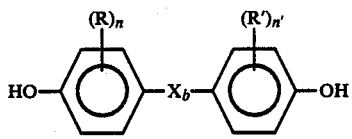

wherein:

X is selected from divalent hydrocarbon radicals,

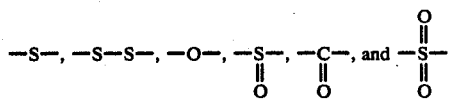

radicals;

each R is independently selected from halogen radicals, monovalent hydrocarbon radicals, and monovalent hydrocarbonoxy radicals;

each R' is independently selected from halogen radicals, monovalent hydrocarbon radicals, and monovalent hydrocarbonoxy radicals;

b is zero or one; and n and n' are independently selected from whole numbers, having a value of from 0 to 4 inclusive.

The divalent hydrocarbon radicals represented by X include alkylene radicals, alkylidene radicals, cycloalkylene radicals, cycloalkylidene radicals, and arylene radicals. Preferably the divalent hydrocarbon radicals represent by X are those containing from 1 to about 15 carbon atoms. Some illustrative non-limiting examples of these radicals include ethylene, propylene, butylene, isopropylene, amylene, ethylidene, propylidene, amylidene, cyclohexylene, cyclohexylidene, phenylene, naphthylene, and methylphenylene.

When b is zero the two aromatic rings are directly joined without any intervening alkylene or other bridging group.

The halogen radicals represented by R and R' include chlorine, bromine and iodine, with chlorine and bromine being the preferred halogen radicals.

The monovalent hydrocarbon radicals represented by R and R' include alkyl radicals, cycloalkyl radicals, ary radicals, alkaryl radicals, and aralkyl radicals. The preferred monovalent hydrocarbon radicals are those containing from 1 to about 15 carbon atoms. Some illustrative non-limiting examples of these monovalent hydrocarbon radicals are methyl, ethyl, propyl, butyl, isobutyl, tertiarybutyl, pentyl, neopentyl, cyclobutyl, cyclohexyl, phenyl, napthyl, butylphenyl, dimethylphenyl, and the like.

The monovalent hydrocarbonoxy radicals represented by R and R' may be represented by the general formula OR" wherein R" is a monovalent hydrocarbon radical of the type described hereinbefore.

When more than one R substituent is present on the aromatic ring they may be the same or different. The same is true of the R' substituent.

Typical of some of the dihydric phenols that may be utilized to prepare the polycarbonate resins useful in the practice of the present invention are:
2,2-bis(4-hydroxyphenyl)propane (bisphenol-A);
bis(4-hydroxphenyl)methane;
2,2-bis(4-hydroxy-3-methylphenyl)propane;
4,4-bis(4-hydroxyphenyl)heptane;
2,2-bis(4-hydroy-3,5-dichlorphenyl)propane;
4,4-thiodiphenol;
3,3-dichloro-4,4'-dihydroxydiphenyl; and the like.

Other dihydric phenols are also available and are disclosed in U.S. Pat. Nos. 2,999,835; 3,028,365 and 3,334,154, all of which are incorporated herein by reference. Bisphenol-A is and preferred dihydric phenol.

It is of course, possible to employ two or more different dihydric phenols rather than utilizing a single dihydric phenol in the preparation of the polycarbonate resins.

In addition to linear polycarbonates obtained by reacting the aforedescribed dihydric phenol with a carbonate precursor, branched polycarbonate resins may also be utilized. The branched polycarbonate resins may be prepared by reacting (i) at least one dihydric phenol of the type described hereinafore, (ii) a carbonate precursor, and (iii) a minor amount of a polyfunctional organic compound. The polyfunctional organic compounds used in making the branched polycarbonates are well known in the art and are disclosed, for example, in U.S. Pat. Nos. 3,525,712; 3,541,049; 3,544,514; 3,635,895; 3,816,373; 4,001,184; 4,294,953 and 4,204,047, all of which are hereby incorporated herein by reference. These polyfunctional organic compounds are generally aromatic in nature and contain at least three functional groups which may be, for example, hydroxyl, carboxyl, carboxylic anhydride, haloformyl, and the like. Some illustrative non-limiting examples of these polyfunctional compounds include trimellitic anhydride, trimellitic acid, trimellityl trichloride, 4-chloroformyl phthalic anhydride, pyromellitic dianhydride, mellitic acid, mellitic anhydride, trimesic acid, benzophenonetetracarboxylic acid, benzophenonetetracarboxylic anhydride, and 4,6-dimethyl-2,4,6-tri-(4-hydroxylphenyl)-heptene-2. The amount of this polyfunctional organic compound or branching agent used is in the range of from about 0.05 to about 2 mole percent based on the amount of dihydric phenol employed, and preferably from about 0.1 to about 1 mole percent.

The carbonate precursor employed may be a carbonyl halide, a carbonate ester, or a bishaloformate. The carbonyl halides which may be employed are carbonyl bromide, carbonyl chloride, and mixtures thereof. Typical of the carbonate esters which may be employed herein are diphenyl carbonate; di(halophenyl)carbonates such as di(chlorophenyl)carbonate, di(bromophenyl)carbonate, di(trichlorophenyl)carbonate. etc., di(alkylphenyl) carbonates such as di(tolyl)carbonate, etc,; di(naphthyl)carbonate; di(chloronaphthyl)carbonate; phenyl tolyl carbonate; chlorophenyl chloronapthyl carbonate etc., or mixtures thereof. The haloformates suitable for use herein as carbonate precursors include bis-haloformates of dihydric phenols such as bis-chloroformates of hydroquinone; bis-haloformates of glycols such as bis-haloformates of ethylene glycol, neopentyl glycol, polyethylene glycol, etc. While other carbonate precursors will occur to those skilled in the art, carbonyl chloride, also known as phosgene, is the preferred carbonate precursor.

In utilizing the interfacial polymerization process the polycarbonate polymers of this invention are generally prepared by employing a chain terminating agent and a catalyst, and an inert organic solvent which serves to dissolve the polycarbonate as it is formed.

The polycarbonate resins useful in the practice of the present invention generally have a number average molecular weight in the range of from about 10,000 to about 60,000.

It is a requirement of the present invention that the polycarbonate resin employed for the outer layer provide the container with excellent impact resistance. The polycarbonate resin employed for the inner layer should have suitable resistance to the liquids to be contained. The first intermediate layer which is disposed between the inner and outer polycarbonate layers is comprised of an amorphous polyamide resin which exhibits a high glass transition temperature, low oxygen transmission rate, and should have an apparent melt viscosity suitable for coextrusion with polycarbonate. Amorphous polyamides for use herein are generally transparent with no distinct melting point, and the heat of fusion is about 1 calorie per gram or less as determined by use of a differential standing calorimeter (DSC). The amorphous polyamides of the present invention are obtained from the reaction products of (a) an aliphatic diamine having the general formula:

wherein $R^1$ is a straight or branched aliphatic hydrocarbon having from 4 to 8 carbon atoms; and (b) a phthalic acid composition selected from acids having the general formula:

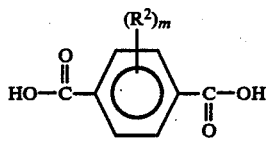

wherein $R^2$ is a substituent group selected from halogens and lower alkyls having from 1 to 3 carbon atoms, and m is from 0 to 4 inclusive. Preferably $R^1$ is hexamethylene as represented by the following formula:

and preferably the phthalic acid is selected from isophthalic acid as represented by the formula:

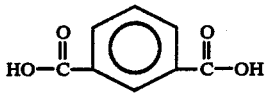

terephthalic acid as represented by the formula:

and mixtures thereof. The term phthalic acid is meant to include reactive derivatives thereof such as phthaloyl halides including terephthaloyl chloride and isophthaloyl chloride. The resultant amorphous polyamide polymer has repeating units represented by the general formula:

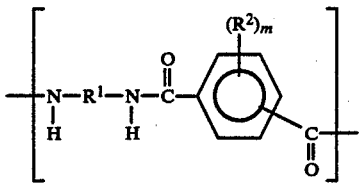

wherein $R^1$, $R^2$ and m are defined as above. The polyamide resin is obtained by reacting substantially equal mole amounts of the diamine with the phthalic acid composition. Preferably the phthalic acid composition consists essentially of terephthalic acid present at a level of 0 to 35 percent by weight of the composition and isophthalic acid present at a level of from 100 to 65 percent by weight of the composition. The most preferred amorphous polyamide is obtained from the reaction products of hexamethylenediamine and a mixture of dicarboxylic acids comprising 65 percent by weight isophthalic acid and 35 percent by weight terephthalic acid.

A suitable amorphous polyamide resin may be obtained from the reaction products of hexamethylene diamine, isophthalic acid, terephthalic acid and 1,4 bisaminomethyl cyclohexane. For amorphous polyamides to be suitable as an intermediate layer in the multilayer polycarbonate container of the present invention, the amorphous polyamide resin should have an apparent melt viscosity somewhat similar to the apparent melt viscosity of the polycarbonate resin at the extrusion temperature. Preferably the amorphous polyamide resin has an apparent melt viscosity sufficiently high to permit coextrusion with the aromatic polycarbonate at a temperature of about 300° C., has a glass transition temperature of at least about 105° C. to permit shape retention during hot-filling, is transparent, provides transparent blends when blended with transparent aromatic polycarbonate resins, and has an oxygen transition rate of at most about 2.0 cc-mil/100 sq in-day-atm.

The hollow containers of the present invention are comprised of at least three layers or plies adjacent to each other. The three layers include at least one first intermediate layer which is comprised of an amorphous polyamide; at least one inner layer comprised of an aromatic polycarbonate; and at least one aromatic polycarbonate outer layer. Preferably the container further comprises a second intermediate layer disposed between the inner layer and the outer layer, the second intermediate layer comprising a transparent resin regrind blend obtained by regrinding scrap obtained during the coextrusion blow molding process. The regrind blend layer may also further comprise additional virgin polycarbonate or polyamide resin to obtain the desired properties in the layer. The scrap comprises aromatic polycarbonate resin obtained from waste portions of the inner and outer layers, and further comprises amorphous polyamide resin obtained from waste portions of the first intermediate layers. This scrap resin also referred to as trim or waste resin can often account for as much as from about 5 to about 50 percent of the total resin used. Consequently, this resin can count for a substantial portion of the total cost of the container. Thus, the discovery that regrind blends of amorphous polyamide and aromatic polycarbonate are transparent permits the utilization of the scrap as a second intermediate layer which functions to give the container additional strength while simultaneously avoiding waste of the scrap obtained during the coextrusion blow molding process and may serve to promote adhesion between adjacent polycarbonate and polyamide layers. This utilization of scrap reduces the overall cost of the bottle.

It has also been discovered that blends of amorphours polyamides and aromatic polycarbonates exhibit unexpectedly good physical properties including clarity, barrier resistance and impact strength. It has been found that amorphous polyamide/aromatic polycarbonate blends, specifically blends of Nylon 6,I,T derived from hexamethylene diamine, terephthalic acid and isophthalic acid and a polycarbonate derived from bisphenol-A and phosgene, are clear and exhibit gas barrier properties which are significantly better than one would expect from their weighted average. For example, a blend of 50 weight percent Nylon 6,I,T having an oxygen transmission rate of 1.5 cc-mil/100 sq in-day-atm and 50 weight percent bisphenol-A polycarbonate having an oxygen transimission rate of 250 cc-mil/100 sq in-day-atm has a blend oxygen transmission rate of 50 cc-mil/100 sq in-day-atm in comparison with a weighted average of about 126 cc-mil/100 sq in-day-atm ($0.50 \times 1.5 + 0.50 \times 250 = 126$). Although the preferred container has two intermediate layers (i.e. a first intermediate layer of amorphous nylon and a second intermediate layer of a blend of amorphous nylon-/aromatic polycarbonate), the amorphous polyamide/aromatic polycarbonate blend may be employed as an intermediate layer alone, as the sole barrier layer or in conjuction with other barrier layers.

The amorphous polyamide/aromatic polycarbonate blend layer, if used as the sole intermediate layer, preferrably has a thickness of at least 1.0 mil and more preferrably at least 2.0 mil. If the blend layer is used in conjuction with an amorphous polyamide layer then the blend layer may be 0.5 mil or greater in thickness. The blend layer has a unique combination of properties not found in either aromatic polycarbonate layers or amorphous nylon layers, namely, good impact strength, good oxygen barrier properties and low cost.

The containers of the present invention may be conveniently prepared by coextrusion blow molding and more specifically, these containers may be made by a method comprising first coextruding the various layers of the material, and blow molding the layers prior to their solidification and a preferred method, wherein the containers are comprised of three plys, i.e. an inner polycarbonate ply and intermediate ply comprised of an amorphous polyamide resin, and an outer polycarbonate ply, the containers are formed by employing three extruders. Two of these extruders extrude polycarbonate while the third extruder extrudes the amorphous polyamide resin. The three extruders extrude three layers of a generally tubular parison which is then blow molded, prior to solidification. Once the three layers solidify, they substantially retain their shape while providing a multilayered container. Optionally the tubular parison can be made by using two extruders and splitting one of the streams therefrom to form the inner and outer layers. Furthermore, the multilayered bottles of the present invention may also be prepared by coinjection blow molding which is a known process for making multilayered structures. Coinjection blow molding is a low scrap process but a two step process, and is a slower and more technically involved process.

The combined minimum thickness of the layers forming the wall of the container is controlled by the fact that this wall should be thick enough to provide sufficient strength, stiffness, rigidity, and integrity to serve as an effective enclosure and container for a variety of materials, such as liquids, placed within the container. Generally this minimum thickness is about 10 mils, and preferably about 20 mils. The maximum combined thickness of the layers forming the walls of the container is not critical but is governed by such secondary considerations as appearance, cost, weight, and the like. As a non-limiting illustration bottles formed from the present three layer structure generally may have a combined wall thickness of from about 30 to about 70 mils.

The minimum thickness of the first intermediate layer and second intermediate layer are such that the layers are in combination effective in functioning as a gas-barrier, i.e. exhibiting substantial gas-barrier properties. This thickness depends, to a certain degree, upon the particular amorphous polyamide resin utilized for the intermediate layers. Generally, however, this minimum thickness is about 0.5 mil, and preferably about 1 mil for the first intermediate layer if no second intermediate layer is employed. The upper thickness range from the first and second intermediate layers is not critical but is controlled by such secondary considerations as cost, ease of fabrication, appearance, bottle weight, and the like.

The minimum thickness of the inner and outer polycarbonate containing layers is generally a thickness which is effective in protecting the central amorphous polyamide layer from shattering during impact. The polycarbonate layers can also serve to carry the amorphous polyamide parison during coextrusion. Generally, this minimum thickness is about 1 mil, and preferably about 5 mils. The upper thickness range of the outer and inner polycarbonate layers is not critical but is controlled by such secondary factors as cost, weight, appearance, ease of fabrication, and the like.

In general the inner polycarbonate layer may have a thickness of from about 1 to about 50 mils, preferably from about 2 to about 20 mils. The outer polycarbonate layer may generally have a thickness of from about 1.0 to about 60 mils, preferably from about 2 to about 50 mils. The intermediate layer may generally have a thickness of from about 0.5 to about 50 mils, preferably from about 1 to about 20 mils.

The polycarbonate resin which comprises the inner and outer layers of the present hollow containers may optionally have admixed therewith commonly known and used additives as long as the container remains transparent.

DESCRIPTION OF THE PREFERRED EMBODIMENT

The following examples are set forth to illustrate the present invention and are not to be construed as limiting the scope of the invention thereto. Unless otherwise indicated all parts and percentages are on a weight basis.

As illustrated by the data the containers of the present invention exhibit good gas-barrier properties have good impact strength, can withstand relatively high temperatures, retain their dimensional stability, and can employ a regrind layer from their waste without losing their transparency.

These properties render the containers of the present invention suitable as containers for various liquids and foodstuffs. These containers offer the advantages of light weight and good impact strength compared with glass containers. The containers of the present invention also exhibit the combined properties of transparency, excellent oxygen barrier properties and shape retention upon exposure to high temperatures.

Obviously, other modifications and variations of the present invention are possible in light of the above teachings. It is, therefore, to be understood that changes may be made in the particular embodiments of the invention described which are within the full intended scope of the invention as defined by the appended claims.

EXAMPLE 1

POLYCARBONATE/NYLON 6,I,T/POLYCARBONATE

ONE-GALLON CONTAINER

A Bekum HV121 extrusion blow molding machine equipped with five individual extruders and a one-gallon mold was used to mold multilayer one-gallon containers with handles. A three layer structure was produced as set forth in Table 1 consisting of an inner layer of Nylon 6,I,T (an amorphous polyamide derived from hexamethylene diamine and a phthalate composition comprising about 65 percent by weight isophthalic acid and 35 percent by weight terephthalic acid) and exterior layers of an aromatic polycarbonate (PC) derived from bisphenol A and phosgene. The amorphous polyamide layer thickness was measured at 2.3 mils. The thickness of the innermost polycarbonate layer was 5.7 mils and that for the outermost polycarbonate layer was 6.5 mils. The oxygen transmission rate for the container was 0.26 cc/package/day. Total bottle weight was 98 to 117 grams. The calculated oxygen transmission rate for the container was 0.32 cc-mil/100 sq in-day-atm based on an oxygen transmission rate of 250 cc-mil/100 sq in-day-atm for polycarbonate and 1.5 cc-mil/100 sq in-day-atm for Nylon 6,I,T and a surface area of 240 square inches for a one-gallon container. The amorphous polyamide layer was disposed between the innermost polycarbonate layer and the outermost polycarbonate layer.

TABLE 1
Extrusion Blow Molding Conditions for PC/Nylon 6,I,T/PC One-Gallon Container

| Extruder | 1 | 2 | 3 | 4 | 5 |
|---|---|---|---|---|---|
| Resin | PC | PC | Nylon 6,I,T | PC | PC |

EXAMPLE 2

Polycarbonate/Regrind/Nylon 6,I,T One-Liter Container

In a similar trail as that described in Example 1, a three layer polycarbonate/regrind/nylon one-liter bottle was blow molded as set forth in Table 2. Hence, through Extruder 4 was fed a blend of 50% Nylon 6,I,T and 50% polycarbonate. Structure analysis revealed a total thickness of about 53 mils comprised of an outermost layer polycarbonate (12 mils), a regrind layer (8.7 mils), and a Nylon 6,I,T innermost layer of about 32 mils. Total bottle weight was 85 to 100 grams. The regrind layer was optically clear leading to a high degree of clarity for the entire structure. The refractive index for the polycarbonate is (1.5865) and that for Nylon 6,I,T (1.5876) are very similar which may in part account for the clarity obtained by the blend. There is good adhesion between the layers. Apparently the regrind layer performs as a tie layer adhering to both the polycarbonate layer and the nylon layer.

TABLE 2
Extrusion Blow Molding Conditions for Polycarbonate/Regrind/Nylon One-Liter Bottle

| Extruder | 1 | 2 | 3 | 4 | 5 |
|---|---|---|---|---|---|
| Resin | Nylon 6,I,T | Nylon 6,I,T | Nylon 6,I,T | REGRIND | PC |

EXAMPLE 3

A similar trial as that described in Example 1 was conducted except that two additional layers of regrind were added producing a five layer one-gallon bottle. Hence, through Extruders 2 and 4 was fed a blend of 50% Nylon 6,I,T and 50% polycarbonate. Structure analysis revealed a total thickness of about 24 mils comprising an innermost layer of polycarbonate (5.6 mils), a regrind layer (1.3 mils), a Nylon 6,I,T layer (3.8 mils), a regrind layer 1.7 mils), and an outermost layer of polycarbonate (9.1 mils). The regrind layers were optically clear leading to a high degree of clarity for the entire structure. The oxygen transmission rate for the structure was 0.13 cc/package/day. Total bottle weight was 120 grams. The bottle was hot fillable a 185° F. and survived a three foot drop impact. Typical machine operating conditions are given in Table 3 below.

TABLE 3
Extrusion Blow Molding Conditions for Polycarbonate/Regrind/Nylon/Regrind/Polycarbonate One-Gallon Container

| Extruder | 1 | 2 | 3 | 4 | 5 |
|---|---|---|---|---|---|
| Resin | PC | Regrind | Nylon 6, I,T | Regrind | PC |
| Drier Temp (F.) | 250 | 235 | 235 | 235 | 250 |
| Screw Speed (rpm) | 14 | 17 | 43 | 16 | 15 |
| Pressure (psig) | 7837 | 4890 | 4820 | 4160 | 7523 |
| Set up Temp (F.) | 495 | 450 | 435 | 450 | 495 |
|  | 500 | 475 | 445 | 475 | 500 |
|  | 485 | 480 | 455 | 480 | 490 |
|  | 485 | 480 | 455 | 480 | 490 |
|  | 461 |  |  |  | 320 |
|  | 511 |  |  |  | 510 |
|  | 509 |  |  |  | 510 |
| Melt Temp (F.) | 546 | — | 480 | 521 | 460 |
| Wall Thickness (mil) | 5.6 | 1.7 | 3.8 | 1.3 | 9.1 |
| Mold Temp (F.) = | 52 | | | | |
| Cycle Time (sec) = | 16.3 | | | | |

EXAMPLE 4

Nylon 6,I,T Monolayer One-Gallon Container

A monolayer one-gallon Nylon 6,I,T bottle was produced according to the condition of Table 4 below in which only Extruder 2 was employed. The 100 gram container failed a one foot drop impact test and also was unsatisfactory in hot fill at 185° F. due to softening and distortion of the structure.

TABLE 4
Extrusion Blow Molding Conditions for Monolayer Selar PA One-Gallon Container

| Extruder | 1 | 2 | 3 | 4 | 5 |
|---|---|---|---|---|---|
| Resin |  | Nylon 6,I,T |  |  |  |

EXAMPLE 5

Polycarbonate/PET/Polycarbonate One-Liter Container

In a manner similar to Example 1, a two layer polycarbonate/polyethylene terephthalate one-liter container was blow molded in which the polyethylene terephthalate was the innermost layer. Polyethylene terephthalate (PET) is commercially available as Kodapak PET PM9921 (density=1.4, iv=0.8 dl/g) from Eastman. PET has a Tg of 70° to 80° C. and a refractive index of 1.65. Typical molding conditions are given in Table 5 below. It was difficult to mold the container due to the low melt strength and low melt viscosity of the PET at coextrusion temperatures causing the parison to drip excessively. A typical bottle structure was 20% polycarbonate and 80% PET. Typical bottle weight was 120 grams at a wall thickness of 22 mils (6 mils polycarbonate and 16 mils PET). The containers would not survive hot fill at 185° F. even up to 67% polycarbonate. A film sample of the 20/80 polycarbonate/PET was taken from a bottle wall and tested for oxygen transmission. The oxygen transmission rate was found to be 1.59 cc/100 sq in-day-atm.

TABLE 5

Extrusion Blow Molding Conditions for Polycarbonate/Polyethylene Terephthalate One-Liter Container

| Extruder | 1 | 2 | 3 | 4 | 5 |
|---|---|---|---|---|---|
| Resin | PC | PET | PET | PET | PET |

As illustrated by the examples, the bottles of the present invention provide hot fill capabilities excellent oxygen barrier properties and high levels of impact strength. Additionally, as illustrated by the examples the regrind obtained from a blend of an aromatic polycarbonate and an amorphous polyamide (Nylon 6,I,T) is clear which allows for minimal scrap in coextrusion blow molding. The polycarbonate employed in the examples of Tables 1-6 was derived from bisphenol A and phosgene.

TABLE 6

Polycarbonate/Amorphous Nylon Blends Oxygen Barrier Properties

| Polycarbonates/Nylon 6,I | Oxygen Transmission Rate cc · mil/100 in²/day atm |
|---|---|
| 100/0 | 300 |
| 70/30 | 112.5 |
| 60/40 | 26.9 |
| 50/50 | 10.4 |
| 0/100 | 2.0–3.0 |

We claim:

1. A multilayered hollow container comprised of:
   (i) an aromatic polycarbonate resin inner layer;
   (ii) an aromatic polycarbonate resin outer layer;
   (iii) a ply of an amorphous polyamide resin disposed between said inner layer and said outer layer, said amorphous polyamide being obtained from the reaction products of hexamethylene diamine, terephthalic acid, and isophthalic acid;
   (iv) a blend layer comprised of a blend of said amorphous polyamide and an aromatic polycarbonate, said blend layer providing adhesion between said ply of amorphous polyamide and one of said polycarbonate layers.

2. The container of claim 1 where said amorphous polyamide has an oxygen transmission rate of at most about 2 cc-mil/100 sq in-day-atm and a glass transition temperature of at least about 105° C.

3. The container of claim 1 wherein said aromatic polycarbonate has an apparent viscosity of about 1500 pascal seconds at 300° C. and said amorphous polyamide having an apparent viscosity of from about 1500 pascal seconds at 300° C. and 100 sec$^{-1}$ apparent shear rate.

4. The container of claim 3 which is made by a coextrusion blowmolding method.

5. The container of claim 1 wherein said polycarbonate resin inner layer and said polycarbonate resin outer layer are derived from the reaction products of a carbonate precursor and bisphenol A.

6. A mutilayered hollow container made by a coextrusion blowmolding method, said container comprising:
   (i) a polycarbonate inner layer comprised of an aromatic polycarbonate resin;
   (ii) a polycarbonate outer layer comprised of an aromatic polycarbonate resin;
   (iii) a first intermediate layer comprised of at least one ply of an amorphous polyamide resin derived from the reaction products of hexamethylene diamine and a phthalate composition selected from the group consisting of isophthalic acid and mixtures of isophthalic acid and terephthalic acid;
   (iv) a blend layer comprised of a blend of an aromatic polycarbonate resin and an amorphous polyamide resin, said blend layer providing adhesion between said first intermediate layer and one of said polycarbonate layers.

7. A multilayered hollow container consisting essentially of:
   (i) an aromatic polycarbonate inner layer;
   (ii) an aromatic polycarbonate outer layer;
   (iii) an amorphous polyamide intermediate layer disposed between said inner layer and said outer layer, said intermediate layer having an oxygen transmission rate of at most about 2 cc-mil/100 sq in-day-atm, and a glass transition temperature of at least about 105° C., said amorphous polyamide having no distinct melting point;
   (iv) a first blend layer comprising a blend of amorphous polyamide resin and aromatic polycarbonate resin, said first blend layer providing adhesion between said aromatic polycarbonate inner layer and said amorphous polyamide intermediate layer; and
   (v) a second blend layer comprising a blend of amorphous polyamide resin and aromatic polycarbonate resin, said second blend layer proving adhesion between said aromatic polycarbonate outer layer and said amorphous polyamide intermediate layer.

8. A multilayered hollow container consisting essentially of:
   (i) an inner layer comprised of an aromatic polycarbonate resin;
   (ii) an outer layer comprised of an aromatic polycarbonate resin;
   (iii) an intermediate layer comprised of an amorphous polyamide resin and located between said inner layer and said outer layer;
   (iv) a first blend layer comprised of a blend of an aromatic polycarbonate resin and an amorphous polyamide resin, said first blend layer providing adhesion between said intermediate layer and said inner layer;
   (v) a second blend layer comprised of a blend of an aromatic polycarbonate resin and an amorphous polyamide resin, said second blend layer providing adhesion between said first intermediate layer and said outer layer.

9. A multilayered hollow container comprised of:
   (i) an aromatic polycarbonate resin layer;
   (ii) an amorphous polyamide resin layer; and
   (iii) a blend layer comprised of a blend of an aromatic polycarbonate resin and an amorphous polyamide resin, said blend layer being disposed between said aromatic polycarbonate resin layer and said amorphous polyamide resin layer, said blend layer providing adhesion between said aromatic polyamide resin layer.

10. A multilayered hollow container comprised of:
    (i) an aromatic polycarbonate resin inner layer;
    (ii) an aromatic polycarbonate resin outer layer;
    (iii) an amorphous polyamide resin layer disposed between said inner layer and said outer layer;
    (iv) a first blend layer of amorphous polyamide resin and polycarbonate resin disposed between said inner layer and said amorphous polyamide resin layer, said first blend layer providing adhesion between said aromatic polycarbonate inner layer and said amorphous polyamide resin layer, said first blend layer providing adhesion between said aromatic polycarbonate inner layer and said amorphous polyamide layer; and (v) a second blend layer of amorphous polyamide resin and polycarbonate resin disposed between said outer layer and said amorphous polyamide resin layer, said second blend layer providing adhesion between said aromatic polycarbonate outer layer and said amorphous polyamide layer.

11. The container of claim 10 wherein said amorphous polyamide resin is derived from hexamethylene diamine, isophthalic acid and terephthalic acid.

12. A multilayered hollow container consisting essentially of:
(i) an aromatic polycarbonate resin inner layer;
(ii) an aromatic polycarbonate resin outer layer;
(iii) an amorphous polyamide resin layer disposed between said inner layer and said outer layer;
(iv) a first blend layer of amorphous polyamide resin and polycarbonate resin disposed between said inner layer and said amorphous polyamide resin layer, said first blend layer providing adhesion between said aromatic polycarbonate inner layer and said amorphous polyamide layer; and
(v) a second blend layer of amorphous polyamide resin and polycarbonate resin disposed between said outer layer and said amorphous polyamide resin layer, said second blend layer providing adhesion between said aromatic polycarbonate outer layer and said amorphous polyamide layer.

13. The container of claim 12 wherein said amorphous polyamide resin is derived from hexamethylene diamine, isophthalic acid and terephthalic acid.

* * * * *